(12) United States Patent
Drotleff et al.

(10) Patent No.: US 7,563,993 B2
(45) Date of Patent: Jul. 21, 2009

(54) INSERT FOR AN OPENING OF AN APPLIANCE

(75) Inventors: Rolf Drotleff, Weil der Stadt (DE); Martin Zankl, Winnenden (DE); Daniel Mueller, Remseck (DE); Eugen Mikeler, Gaeufelden (DE)

(73) Assignee: Lapp Engineering & Co., Zug (CH)

( * ) Notice: Subject to any disclaimer, the term of this patent is extended or adjusted under 35 U.S.C. 154(b) by 319 days.

(21) Appl. No.: 11/526,199

(22) Filed: Sep. 22, 2006

(65) Prior Publication Data

US 2008/0073118 A1  Mar. 27, 2008

(51) Int. Cl.
*H02G 3/18* (2006.01)

(52) U.S. Cl. .................. 174/655; 174/659; 174/660; 174/653; 285/322; 403/326

(58) Field of Classification Search .................. 174/480, 174/481, 650–656, 659, 660, 665, 668, 669, 174/68.1, 72 A, 135, 74 A, 84 C, 93, 73.1; 285/256, 257, 319, 322, 323, 331; 403/326, 403/329; 439/411–414, 404
See application file for complete search history.

(56) References Cited

U.S. PATENT DOCUMENTS

| | | | | | |
|---|---|---|---|---|---|
| 1,488,175 | A | * | 3/1924 | Strandell | 174/653 |
| 4,250,348 | A | * | 2/1981 | Kitagawa | 174/655 |
| 4,525,000 | A | | 6/1985 | Bachle | |
| 4,600,803 | A | * | 7/1986 | Holzmann | 174/653 |
| 5,350,204 | A | * | 9/1994 | Henniger | 174/655 |
| 5,405,172 | A | * | 4/1995 | Mullen, Jr. | 174/655 |
| 5,600,094 | A | * | 2/1997 | McCabe | 174/653 |
| 5,866,853 | A | * | 2/1999 | Sheehan | 174/653 |
| 6,488,317 | B1 | * | 12/2002 | Daoud | 285/322 |
| 6,511,099 | B2 | * | 1/2003 | Bartholoma et al. | 174/665 |
| 6,521,832 | B2 | * | 2/2003 | Lange | 174/657 |
| 6,639,146 | B1 | | 10/2003 | Chiu | |
| 6,754,430 | B1 | | 6/2004 | Kuehne | |
| 2002/0006309 | A1 | | 1/2002 | Bartholoma et al. | |

FOREIGN PATENT DOCUMENTS

| | | |
|---|---|---|
| DE | 41 28 632 | 9/1992 |
| DE | 42 08 356 | 8/1993 |
| DE | 103 41 033 | 4/2005 |
| EP | 1 220 407 | 7/2002 |
| GB | 2 138 218 | 10/1984 |

* cited by examiner

*Primary Examiner*—Angel R Estrada
(74) *Attorney, Agent, or Firm*—Lipsitz & McAllister, LLC

(57) ABSTRACT

In order to improve an insert for an opening in a wall area of an appliance comprising a housing socket, an assembly device provided on the housing socket, with an assembly section which can be guided through the opening in the wall area and has snap elements which engage behind an edge of the opening as well as with a pressure ring which is arranged on the housing socket at a distance from the snap elements and can be adjusted in the direction of the snap elements by means of an advancing guide as a result of a rotary movement about the central axis, in such a manner that a secure assembly of the housing socket is possible, it is suggested that the pressure ring be rotatable in a first direction of rotation in order to secure the housing socket and that the housing socket be adapted to be fixed against any co-rotation in the first direction of rotation by means of a holding section element.

29 Claims, 13 Drawing Sheets

INSERT FOR AN OPENING OF AN APPLIANCE

BACKGROUND OF THE INVENTION

The invention relates to an insert for an opening in a wall area of an appliance, wherein the opening is provided, in particular, for feeding a cable through it, comprising a housing socket, an assembly device provided on the housing socket with an assembly section which can be guided through the opening in the wall area of the appliance and has snap elements which engage behind an edge of the opening as well as with a pressure ring which is arranged on the housing socket at a distance from the snap elements and can be adjusted in the direction of the snap elements by means of a first advancing guide as a result of a rotary movement about the central axis.

Inserts of this type designed as cable feed-throughs are known from DE 41 28 632 C1.

The problem with these inserts is, however, that the housing socket mounted on the wall area of an appliance can come loose.

The object underlying the invention is, therefore, to improve an insert of the generic type such that a secure assembly of the housing socket is possible.

SUMMARY OF THE INVENTION

This object is accomplished in accordance with the invention, in an insert of the type described at the outset, in that the pressure ring is rotatable in a first direction of rotation in order to secure the housing socket and that the housing socket can be fixed against any co-rotation in the first direction of rotation by means of a holding section element.

The advantage of the solution according to the invention is to be seen in the fact that with a pressure ring designed in such a manner it is possible, in a simple manner, to secure the housing socket on the wall area having the opening in a stable manner.

Such a securing of the pressure ring on the wall area can be realized, in particular, due to the fact that the pressure ring can be adjusted in the direction of the snap elements by means of a first threaded guide.

An advantageous self-locking may be brought about in that the first threaded guide for moving the pressure ring comprises a thread which is always self-%locking on account of its pitch, i.e., irrespective of the material.

The insert for the opening may be designed in the most varied of ways.

A common type of insert provides for the housing socket to be provided with a central passage, for a fixing member with a clamping element rotatable about a central axis of the central passage to be provided on the housing socket for securing a cable guided through the insert.

Such a design of the insert represents a cable feed-through and is normally also designated as a cable feed-through.

The holding section element could be provided separately from the clamping element on the housing socket.

One favorable solution provides, however, for the clamping element to be designed as a holding section element and thus have a dual function.

It is particularly favorable with this type of solution when the pressure ring is rotatable for securing the housing socket in the first direction of rotation which extends in the opposite direction to a second direction of rotation of the clamping element for securing the cable guided through.

The advantage of this embodiment according to the invention is to be seen in the fact that any loosening of the assembly device, in particular, the pressure ring is avoided as a result of the opposite directions of rotation when the clamping element is rotated in the second direction of rotation for securing the cable guided through when the cable feed-through is mounted on the appliance.

Alternatively or in addition hereto, the abovementioned object is accomplished in accordance with the invention, in a cable feed-through of the type described at the outset, in that the pressure ring can be adjusted in the direction of the snap elements by a threaded guide which has a greater self-locking than a second threaded guide provided for the movement of the clamping element for securing the cable.

This solution likewise achieves the aim that the cable feed-through once mounted securely on the wall area due to adjustment of the pressure ring will not come loose when the clamping element is moved for securing the cable guided through.

In this respect, it is particularly favorable when the first threaded guide provided for the pressure ring has at least one thread turn with a smaller pitch than at least one thread turn of the second threaded guide.

Furthermore, a favorable embodiment provides for the second threaded guide for moving the clamping element to comprise a multiple thread.

The second threaded guide for moving the clamping element preferably comprises a trapezoidal thread.

Alternatively to the design of the insert as a cable feed-through, a different solution provides for the housing socket to have a tool engaging element on a side facing away from the assembly device.

Such a design of the housing socket may be provided for feeding special lines through or, when the housing socket is closed on a side facing away from the assembly device, as a blind insert for closing the opening in the wall area of the appliance when this opening is not required.

The tool engaging element has the advantage that with it it is possible to avoid any rotation of the housing socket by engaging with a tool on the tool engaging element and, therefore, to be able to realize a securing of the housing socket in a simple manner by way of rotation of the pressure ring in the first direction.

With respect to the design of the snap elements for securing the assembly section, no further details have so far been given. One particularly advantageous solution provides, for example, for the snap elements to have supporting surfaces which are movable radially in relation to a central axis of the central passage and engage behind an edge of the opening in the wall area and with which they can abut on the wall area.

As a result of the fact that the snap elements are movable radially in relation to the central axis, the cable feed-through according to the invention may be inserted in a simple manner into the opening of the wall area in order to abut the supporting surfaces on a side of the wall area to the rear in the direction of insertion.

In order, in addition, to prevent the assembly section being shifted off center in the case of an opening configured larger than its diameter and in order, moreover, to avoid the snap elements being able to slide along the wall area and thus be spread apart, centering surfaces provided on the snap elements are preferably associated with the supporting surfaces of the snap elements.

Centering surfaces of this type can abut, in particular, on a side of the opening facing the central axis and, on the one hand, lead to a centering of the assembly section in the opening and, on the other hand, prevent any spreading of the snap elements.

In this respect, it is particularly favorable when the assembly section has snap elements arranged on oppositely located sides.

One solution provides for the snap elements to be arranged such that they are located directly next to one another in pairs, i.e., that the snap elemerits located directly next to one another are not separated from one another by webs but merely by a space which allows an independent movement of the snap elements relative to one another.

It is preferably provided in the sense of an optimum alignment of the assembly section relative to the opening for snap elements to be provided on the assembly section at an angular spacing of less than 180° around the central axis.

In order to prevent the assembly section from also turning in the opening of the wall area during the rotation of the pressure ring or, in particular, of the clamping element, as well, one particularly advantageous embodiment provides for the snap elements to be provided with a coating increasing friction which, for its part, bears, in particular, the supporting surface.

It is even more advantageous when the coating increasing friction also bears the centering surface so that as good a frictional fixing of the assembly section as possible in the opening can be brought about not only via the centering surface but also via the supporting surface.

Another advantageous solution provides for the snap elements to be provided with surface structures inhibiting a rotation of the assembly section.

Surface structures of this type are ribs or projections or roughened surfaces which can be provided, in particular, in the area of the supporting surface and also, in particular, in the area of the centering surfaces.

An additional, advantageous solution inhibiting rotation of the assembly section provides for the assembly section to have projections interacting in a frictional manner with an edge of the opening in areas outside the snap elements.

Projections of this type can be ribs or fins which can have material partially removed from them or be deformed when the assembly section is inserted into the opening in order to provide a frictional, where applicable, partially form-locking connection between the assembly section and the edge of the opening which is as good as possible.

In the simplest case, the projections are designed as ribs integrally formed on the assembly section.

With respect to the design of the pressure ring, no further details have so far been given. One advantageous solution, for example, provides for the pressure ring to have a flange surface which faces the wall area and with which the pressure ring can abut on the wall area in order to clamp the wall area between the supporting surfaces of the snap elements and the flange surface.

In order to be able to bring about sealing, in particular, in the area of the opening of the wall area, it is preferably provided for the pressure ring to have a receiving means for a sealing ring.

The receiving means is expediently designed as a recess which adjoins the flange surface and merges into a threaded passage of the pressure ring so that the sealing ring can also be used for sealing in relation to the assembly section.

In this respect, the recess is expediently designed such that it has a pressing surface acting on the sealing ring in the direction of the wall area and in the direction of the assembly section so that a dual sealing can be realized, namely, on the one hand, against the wall area and, on the other hand, against the assembly section.

In this respect, it is particularly favorable when the assembly section has a cylindrical contact surface for the seal.

In order to obtain pretensioning in the direction of the central axis during the insertion of the assembly section into the opening of the wall section and locking of the snap elements which sees to it that the snap elements abut on a side of the wall section with their supporting surfaces and, therefore, the assembly section does not turn in the opening, it is preferably provided for the pressure ring to be provided with an elastic pretensioning element.

This elastic pretensioning element sees to it that after the supporting surfaces of the snap elements have engaged behind the wall section, these abut on the wall section and at least bring about a certain securing against rotation of the assembly section in the opening of the wall area.

Such a pretensioning element may be an elastic ring which is supported on the pressure ring.

This elastic ring is preferably arranged in a recess of the pressure ring which extends from the flange surface in the direction of the threaded passage.

Furthermore, it has proven to be expedient when the recess has an extension such that during the tightening of the pressure ring the elastic pretensioning element thereby acted upon in the direction of the central axis can be moved into the recess and, therefore, it is possible for the pressure ring to, finally, act directly on the wall section with the flange surface on its side facing it.

A particularly favorable solution provides, in addition, for the elastic pretensioning element to be effective at the same time as a sealing element, namely as a sealing element which brings about a sealing between one side of the wall section and a circumferential surface of the housing socket so that a sealed connection exists between the side of the wall section and the circumferential surface of the housing socket.

An additional, advantageous embodiment of the solution according to the invention provides for the sealing ring to have pretensioning elements held on it in a flexible manner.

It is possible with such pretensioning elements to bring about a securing of the pressure ring on the wall area and also already generate a certain pretensioning, which prevents any loosening of the assembly device due to rotation of the pressure ring, when the wall area is not acted upon fully by the pressure ring.

It is particularly favorable when the pretensioning elements are designed so as to project from a flange surface of the pressure ring in the direction of the wall area so that the pretensioning elements act first of all on the wall area before the pressure ring acts fully on it.

With respect to the assembly of the pressure ring on the housing socket, the most varied of possibilities are conceivable.

One advantageous development provides for the pressure ring to be movable beyond the snap elements towards the threaded guide provided for the movement thereof and to then be mountable on the threaded guide.

This solution offers the possibility of selecting the diameter of the pressure ring to be as small as possible, preferably approximately in the order of magnitude of the clamping element and, therefore, to provide advantageous assembly conditions.

In order to be able to move the pressure ring over and beyond the snap elements, it is, for example, conceivable in one advantageous solution for the pressure ring to be movable beyond the snap elements due to an elastic deflection movement of the snap elements and so the snap elements have to perform a deflection movement comparable to the insertion of the assembly section in order to move the pressure ring as far as the thread.

This solution does, however, have the advantage, on the other hand, that, as a result, the pressure ring is fixed by the snap elements in a captive manner when it is moved beyond the snap elements.

Another advantageous solution provides for the pressure ring to have recesses corresponding to the size and the arrangement of the snap elements. These recesses allow the pressure ring to move beyond the snap elements without any deflection movement thereof.

The recesses could penetrate a substantial part of the pressure ring. One advantageous solution provides for the thread of the pressure ring to have the recesses and, therefore, the recesses may be realized simply by way of missing threaded areas.

An additional, favorable solution provides for the pressure ring to be separable along a dividing surface which divides the pressure ring, in particular, into two arc segments and to be placeable on the assembly section with connection of the two pressure ring parts.

Additional features and advantages of the invention are the subject matter of the following description as well as the drawings illustrating several embodiments.

BRIEF DESCRIPTION OF THE DRAWINGS

FIG. 1 shows a partially cutaway side view of a first embodiment of an insert according to the invention as cable feed-through;

FIG. 4 shows a perspective illustration of a housing socket of a second embodiment of an insert according to the invention as cable feed-through;

FIG. 5 shows a perspective illustration of a third embodiment of an insert according to the invention as cable feed-through;

FIG. 6 shows a perspective illustration of a fourth embodiment of an insert according to the invention as cable feed-through;

FIG. 7 shows a perspective illustration of a pressure ring of a fifth embodiment of an insert according to the invention as cable feed-through;

FIG. 8 shows a perspective illustration of a pressure ring of a sixth embodiment of an insert according to the invention as cable feed-through;

FIG. 10 shows a perspective illustration of a pressure ring of a seventh embodiment of an insert according to the invention as cable feed-through;

FIG. 11 shows a perspective exploded illustration of a pressure ring of an eighth embodiment of an insert according to the invention as cable feed-through;

DETAILED DESCRIPTION OF THE INVENTION

Figure 1:
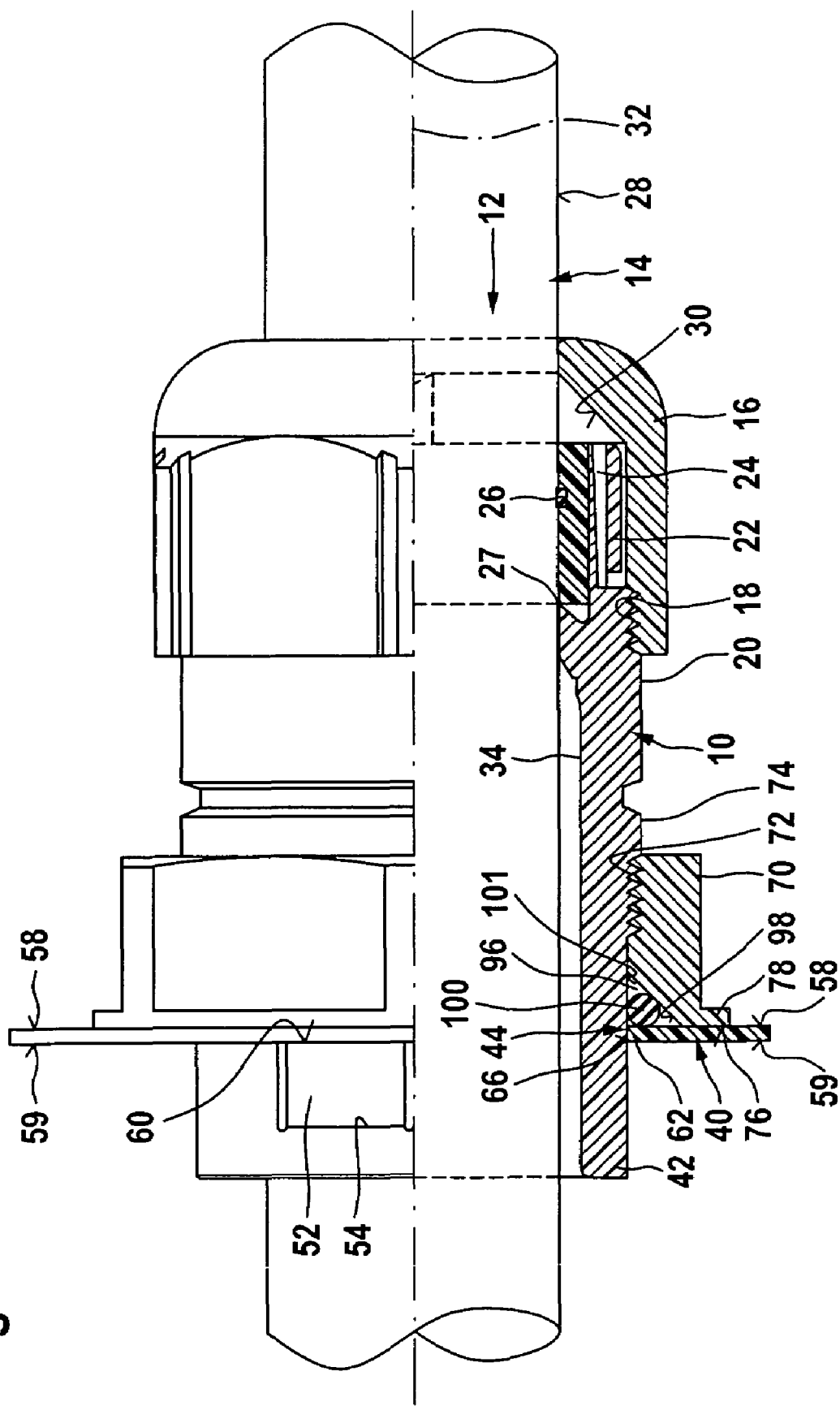

One embodiment of a cable feed-through according to the invention, illustrated in FIG. 1, comprises a housing socket which is designated as a whole as 10 and is provided with a fixing member 12 for a cable 14 to be guided through the cable feed-through.

In detail, the fixing member 12 comprises a clamping element which is designed as a cap nut 16 and can be screwed with an internal thread 18 onto an external thread 20 of the housing socket 10, wherein the clamping element must not only be a pure clamping element but, for example, can also be provided, in addition, with a kink protection for the cable, for example, an antikink spiral or a traction relief.

Furthermore, the housing socket 10 comprises, in an end area 22 engaged over by the cap nut 16 and adjoining the external thread 20, a fin basket which is designated as a whole as 24, encloses a sealing ring 26 and with which the sealing ring 26 can be acted upon in such a manner that it abuts, on the one hand, sealingly on a sealing edge 27 of the housing socket 10 and, on the other hand, sealingly on a casing 28 of the cable 14.

In order to act on the fin basket 24, the cap nut 16 is provided with a conical surface 30 which acts on the fin basket 24 in the direction of a central axis 32 of a central passage 34 of the housing socket 10 when the cap nut 16 is screwed with the internal thread 18 onto the external thread 20.

In order to mount the housing socket 10 on a wall area 40 of an appliance, the housing socket 10 is provided with an assembly device 41 which has an assembly section 42 which can be guided through an opening 44 of the wall area 40.

Figure 3:
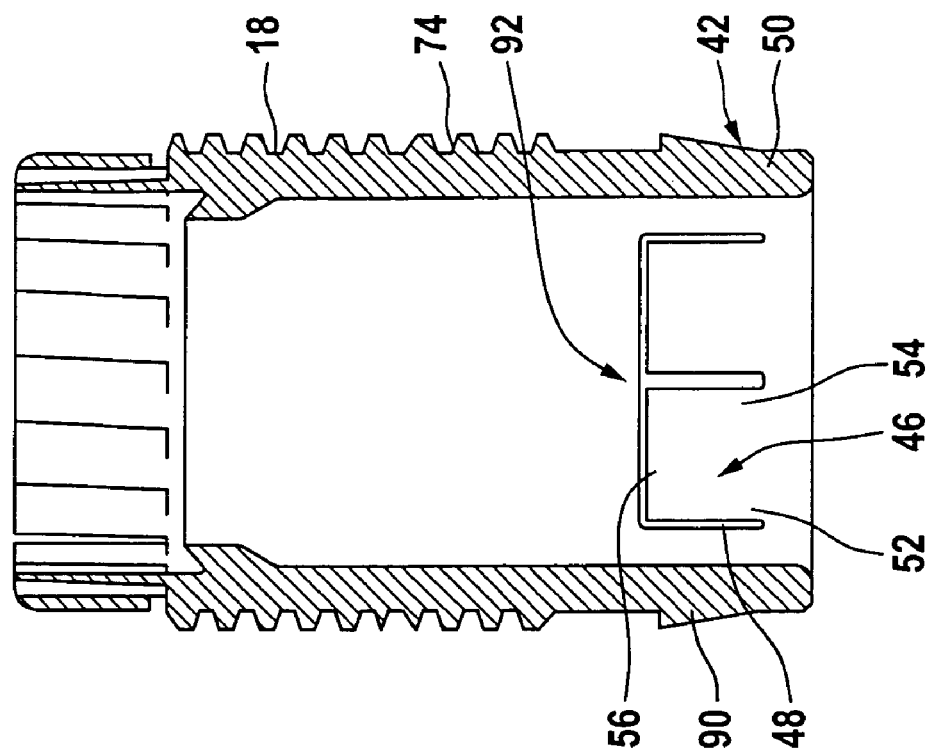
FIG. 3 shows a section along line 3-3 in FIG. 2.
Figure 2:
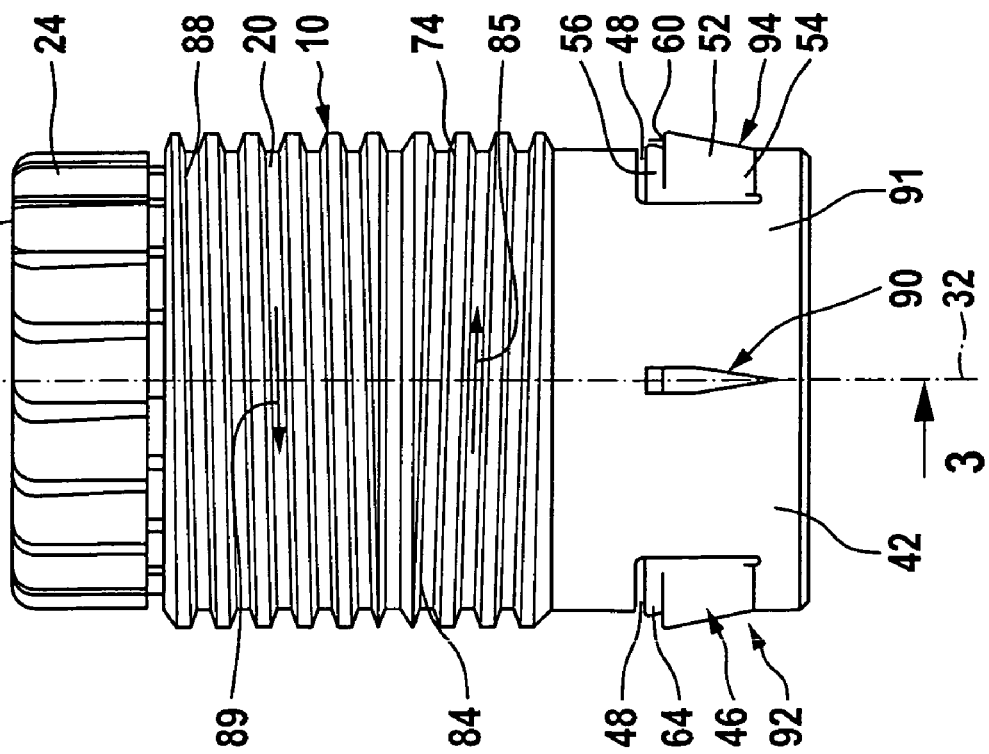
FIG. 2 shows a side view of a housing socket of the first embodiment.

The assembly section 42, as illustrated in FIGS. 1 to 3, is provided with snap elements 46 which are integrally formed in one piece on the assembly section 42 and are each formed as tongues 52 which are elastic transversely to the central axis 32 by way of a U-shaped groove 48 which penetrates a wall 50 of the assembly section 42, the tongue section 54 of these tongues merging into the wall 50 of the assembly section 42 and the tongues having at a tongue end 56 located opposite the tongue section 54 supporting surfaces 60 which extend transversely to the central axis 32 and, as illustrated in FIG. 1, are in a position, once the assembly section 42 has been guided through the opening 44 from a first side 58 of the wall area 40 to a second side 59, to engage behind an edge 62 of the opening 44 on the second side 59 of the wall area 40 so that the edge 62 of the opening can abut on the supporting surfaces 60.

Moreover, centering surfaces 64 are provided, in addition, on the tongue end 56 and these surfaces engage in the opening 44 and can abut on an inner surface 66 of the edge 62 of the opening facing the assembly section 42 in order to center the assembly section 42 and, therefore, the housing socket 10 in the opening 44.

At the same time, the centering surfaces 64 prevent any spreading of the tongues 52, which may occur with a strong tensile load on the assembly section 42, due to movement thereof away from the central axis 32.

In order to be able to secure the assembly section 42 relative to the edge 62 of the opening of the wall area 40, a pressure ring 70 enclosing the housing socket 10 is provided, as illustrated in FIG. 1, and this ring can be screwed with an internal thread 72 onto an external thread 74 of the housing socket 10 and can, therefore, be moved in the direction of the central axis 32 as a result of rotation.

As a result, a flange surface 76 of a pressure flange 78 integrally formed on the pressure ring 70 may abut on the wall area 40 on a side located opposite the supporting surfaces 60 and, therefore, clamp the wall area 40 between the supporting surfaces 60 and the flange surface 76.

In order to make a secure assembly of the housing socket 10 on the wall area 40 possible, a thread turn 84 of the external thread 74 and a corresponding thread turn 82 of the internal thread 72 are provided with a pitch in relation to the central axis 32 which is less than an angle of the self-locking for the material pairing of internal thread 72 and external thread 74.

Furthermore, the internal thread 72 and the external thread 74 are so-called left-hand threads and so an abutment of the flange surface 76 on the wall area 40 requires a direction of rotation 85 corresponding to an anticlockwise rotation.

In contrast thereto, the external thread 18 on the housing socket 10 for screwing on the cap nut 16 is a right-hand thread and so the screwing on of the cap nut 16 requires a direction of rotation 89 corresponding to a clockwise direction, wherein thread turns 88 of the external thread 20 have a larger pitch than the thread turns 84 and need also not have a pitch which is less than the pitch required for the self-locking.

On the contrary, the cap nut 16 may be secured non-rotatably on the fin basket 24 in that the conical surface 30 has projections locking with the fin basket 24.

For example, the thread turns 88 of the external thread 20 are thread turns 88 of a double trapezoidal thread, configured as a right-hand thread, which, with a small rotation of the cap nut 16, allow a large movement of the cap nut 16 in the direction of the central axis 32 and, therefore, an appreciable movement of the fin basket 24 in the direction of the central axis 32 in order to be able to abut the sealing ring 26 securely on the casing 28 of the cable 14.

Furthermore, not only the external thread 20 but also the external thread 74 of the housing socket 10 preferably have a diameter which is approximately of the same size and so it is not possible to move the pressure ring 70 as a whole beyond the external thread 18 onto the external thread 74 from the side of the fin basket 24.

On the contrary, in the first embodiment it is possible to attach the pressure ring 70 only from the side of the assembly section 42, wherein the internal thread 72 must be moved beyond the snap elements 46 which is, however, possible due to the fact that the tongues 52 can deflect in an elastic manner with their supporting surfaces 60 radially inwards towards the central axis 32.

As a result of the fact that the thread 72, 74 provided for displacing the pressure ring 70 with the flange surface 76 in the direction of the wall area 40 is a left-hand thread, this will not come loose during tightening of the cap nut 16 with a right-hand thread but continue to tighten and so it is ensured that the cable feed-through once mounted on the wall area 40 by means of the assembly device does not come loose during the subsequent fixing of the cable 14 guided through the cable feed-through with the fixing member 12 due to tightening of the cap nut 16 but remains securely mounted on the wall area 40.

The securing of the assembly section 42 at the edge 62 of the opening of the wall area 40 can be improved further in that the assembly section 42 has in wall areas 91 between the tongues 52 additional ribs 90 which are integrally formed thereon and provide for an additional centering and, preferably, a force-locking, non-rotatable securing of the assembly section 42 in the opening 44.

The ribs 90 are designed such that they are deformed when the assembly section 42 is guided through the opening 44 or also that material is partially removed from them but they still abut in a frictional manner on the inner surface of the edge 62 of the opening.

In the first embodiment according to FIGS. 1 to 3, the snap elements 46 are preferably designed as pairs 92, 94 which are arranged on oppositely located sides of the central axis 32, wherein the tongues 52 of the two snap elements 46 forming one of the pairs 92, 94 are preferably located immediately next to one another.

The first embodiment of the cable feed-through according to the invention may, in principle, be produced from any optional materials as long as the flexible tongues in the assembly section 42 may be realized with them.

It is particularly favorable when the housing socket 10, the retaining nut 16 and the pressure ring 70 are all produced from a plastic material.

As a result, a flexible movability of the snap elements 46 may be realized in a simple manner.

In order to bring about a sealed connection between the housing socket 10 and the wall area 40, the pressure ring 70 is provided with a recess 96 which is formed by a pressing surface 98 running conically in relation to the central axis 32 and extending from the flange surface 76 as far as the internal thread 72.

A sealing ring 10 is located in the recess 96 and this, for its part, can abut on the edge 62 of the opening and a circumferential surface 101 of the housing socket 10 which directly adjoins the wall area 40 in order to bring about, as a result, a sealed connection between the circumferential surface 101 and the edge 62 of the opening.

In this respect, the conical pressing surface 98 of the pressure ring 70, during the tightening of the pressure ring 70 in order to abut its flange surface 76 on the wall area 40, causes the sealing ring 100 to abut not only on the edge 62 of the opening but also on the circumferential surface 101 at the same time in a manner acted upon with a force in order to bring about a sealed connection between the housing socket 10 and the wall area 40.

Figure 4:
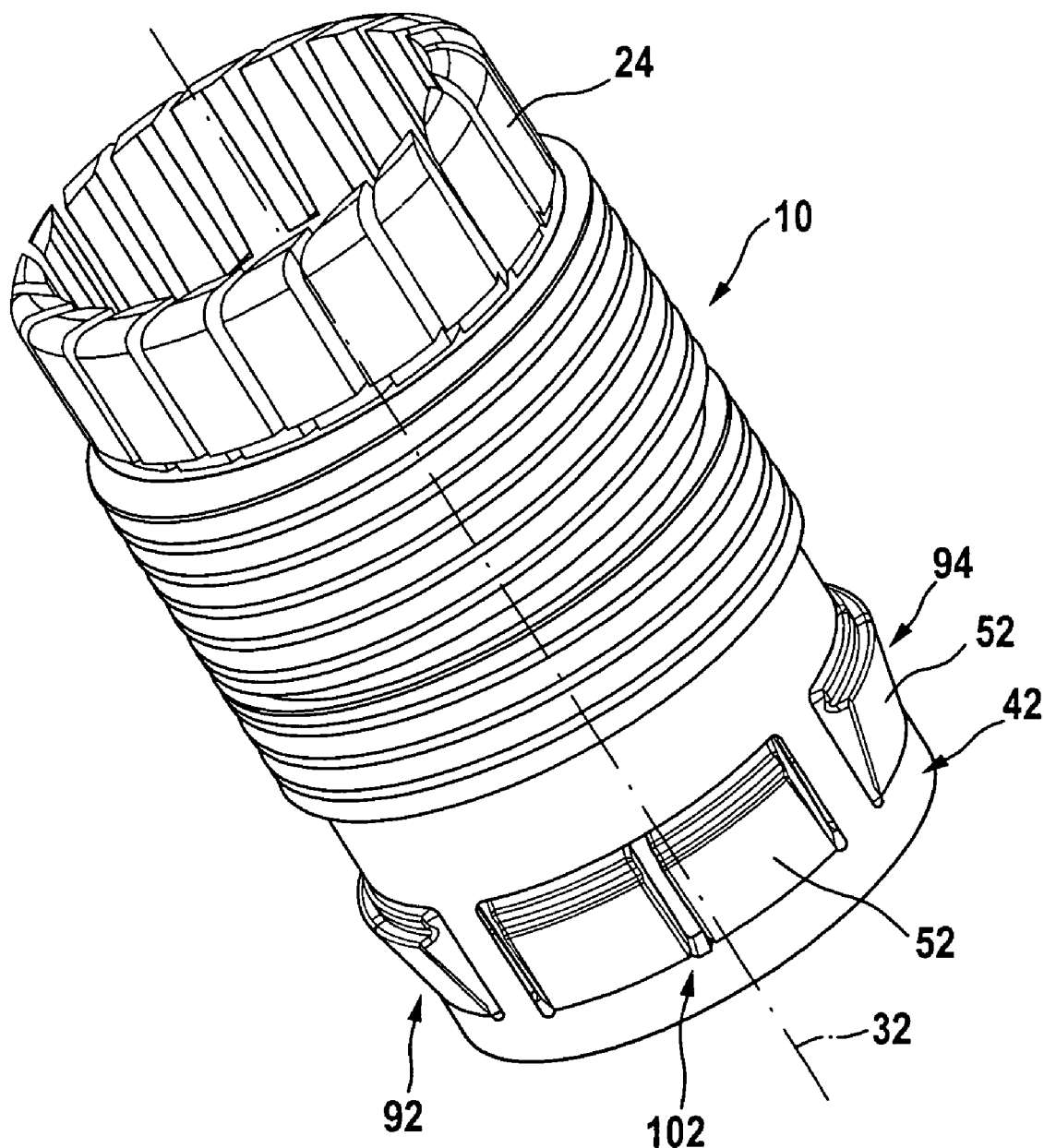

In a second embodiment of the cable feed-through according to the invention, the housing socket 10 of which is illustrated in FIG. 4, those elements which are identical to those of the first embodiment are given the same reference numerals and so reference can be made in full to the explanations concerning the first embodiment with respect to their description.

In contrast to the first embodiment, not only are the pairs 92, 94 of snap elements 46 located opposite one another with respect to the central axis 32 provided in the second embodiment but also, offset in relation to them at an angular distance of approximately 90°, additional pairs of snap elements 46 which are located opposite one another in relation to the central axis 32 and of which only the pair 102 of tongues 52 is visible in FIG. 4.

Figure 5:
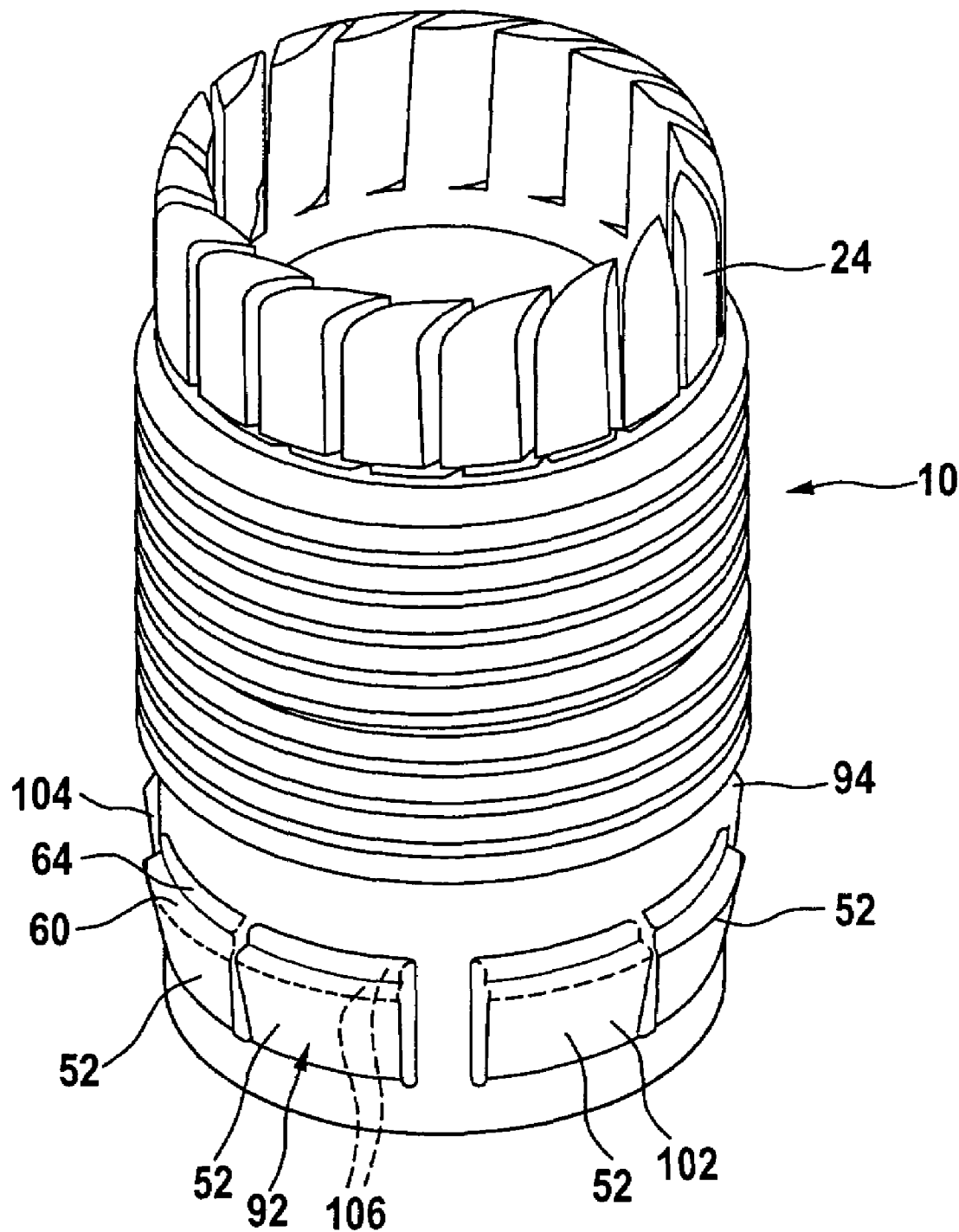

In a third embodiment of a cable feed-through according to the invention, illustrated in FIG. 5, only the housing socket 10 is likewise illustrated, with the pairs 92 and 94 as well as the pairs 102 and 104 of snap elements 46.

Moreover, the tongues 52 are provided in the area of their supporting surfaces 60 and their centering surfaces 64 with a coating 106 which increases friction at the edge 62 of the opening and improves the frictional securing of the assembly section 42 in the opening 44.

Figure 6:
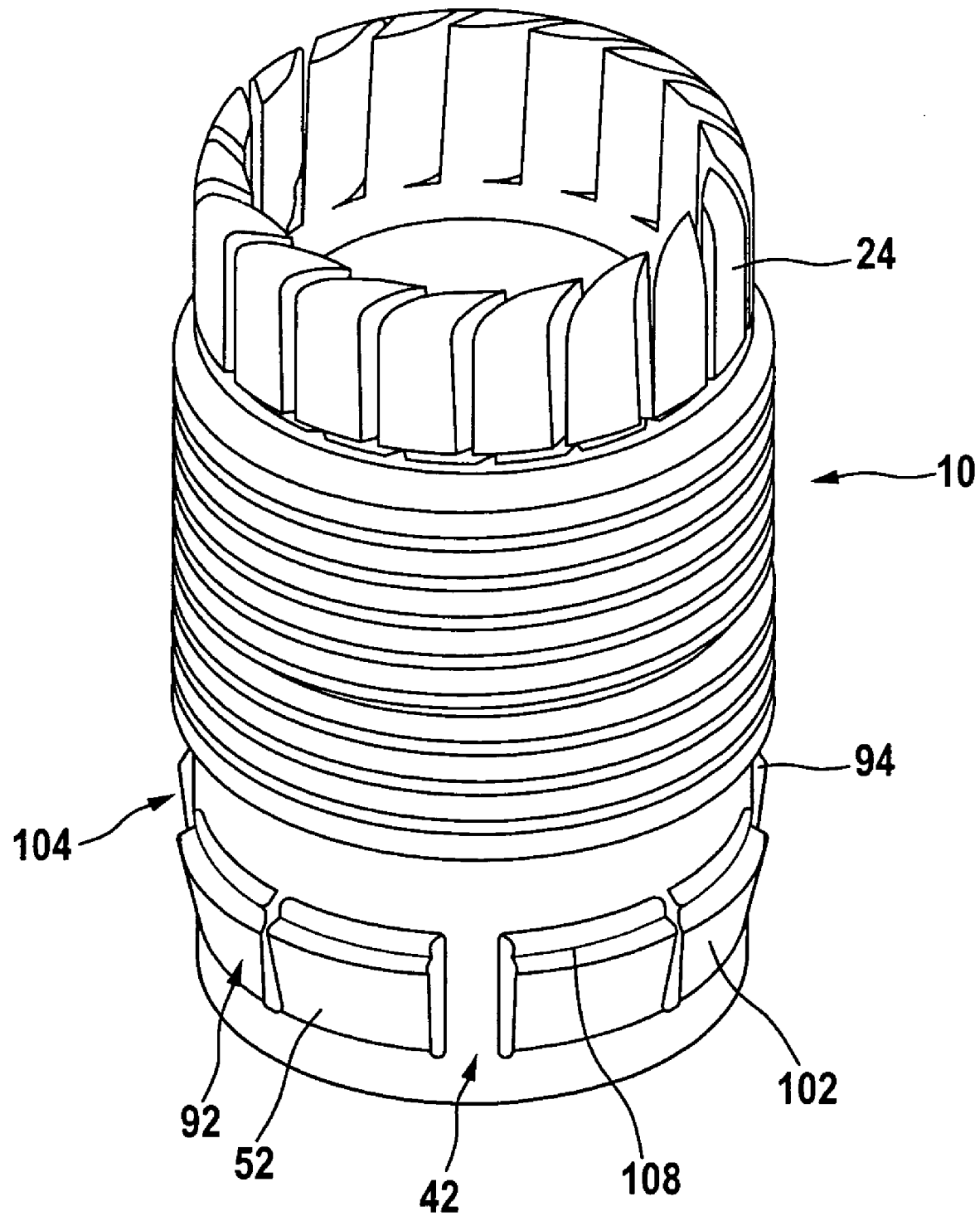
Figure 7:
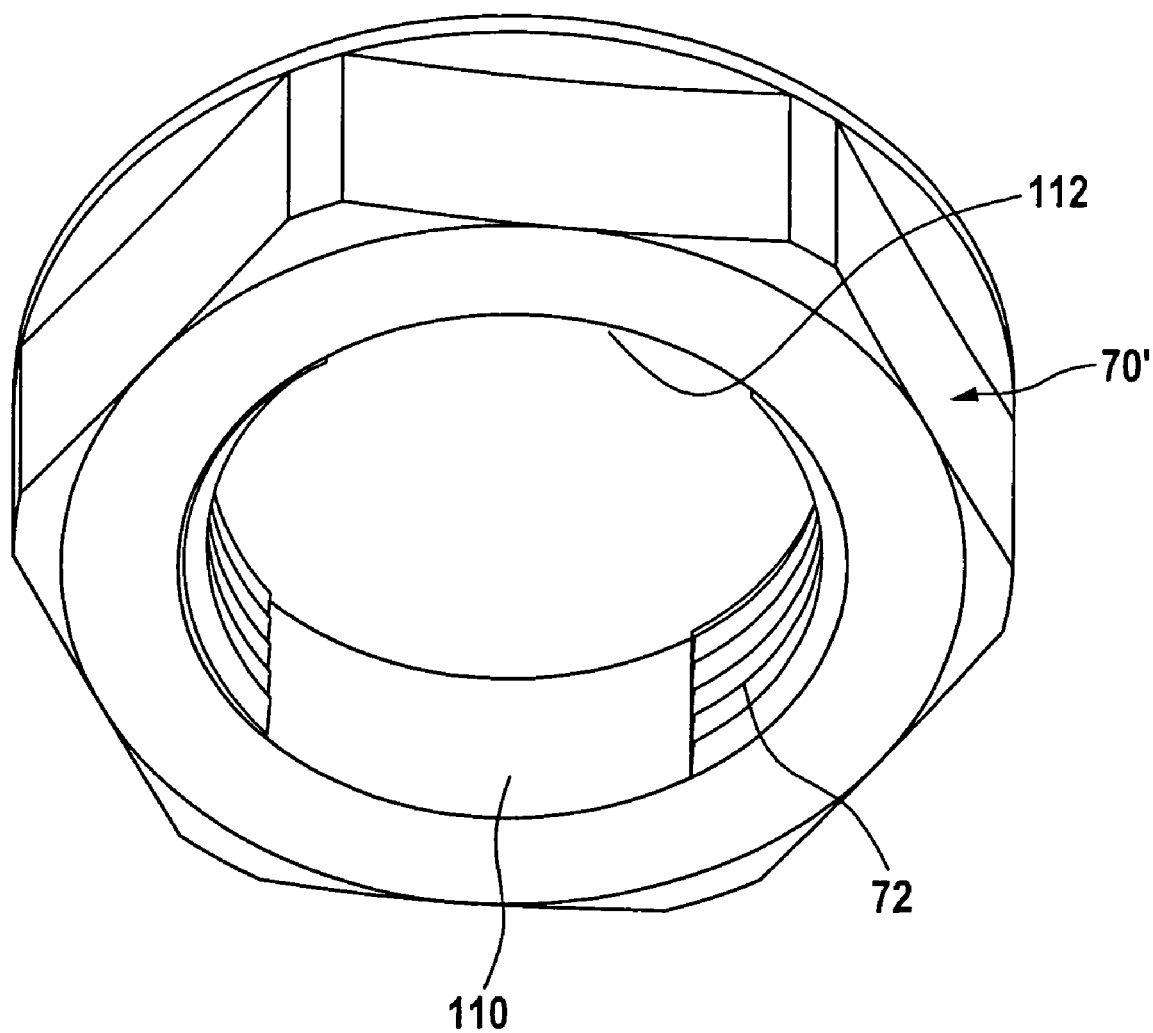

Alternatively to the provision of the coating 106, the tongues 52 of the pairs 92, 94, 102, 104 are provided in a fourth embodiment illustrated in FIG. 6, which likewise merely shows the housing socket 10, with ribs 108 which likewise have a friction-increasing effect in the area of the opening 44 by abutting on the edge 62 of the opening in order to improve the force-locking and non-rotatable fixing of the assembly section 42 to the wall area 40.

As for the rest, both the third and fourth embodiments are identical to the preceding embodiments and so reference is made to the explanations concerning these embodiments.

In a fifth embodiment, the pressure ring 70' is preferably designed such that its internal thread 72 has recesses 110 and 112 which have in circumferential direction an angular extension corresponding to the pairs 92, 94 of tongues 52 and so the pressure ring 70' can move over the tongues 52 of the pairs 92, 94 as in the first embodiment without the necessity of having to deform them, wherein the tongues 52 of the pairs 92, 94 may be moved through the respective recesses 110 and 112 in the internal thread 72 in the direction of the central axis 32.

With respect to the remaining features of the fifth embodiment, reference is therefore made to the explanations concerning the first embodiment.

Figure 8:
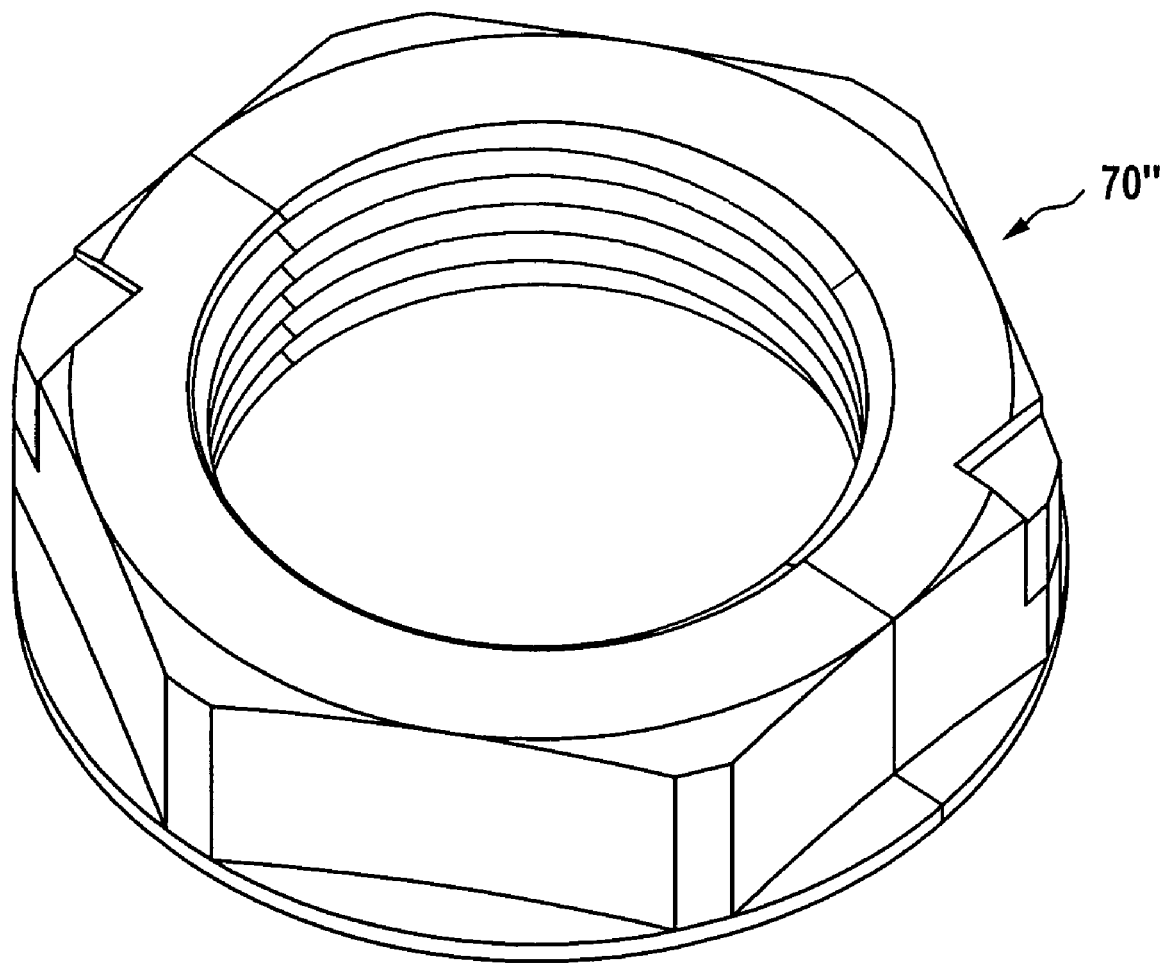
Figure 9:
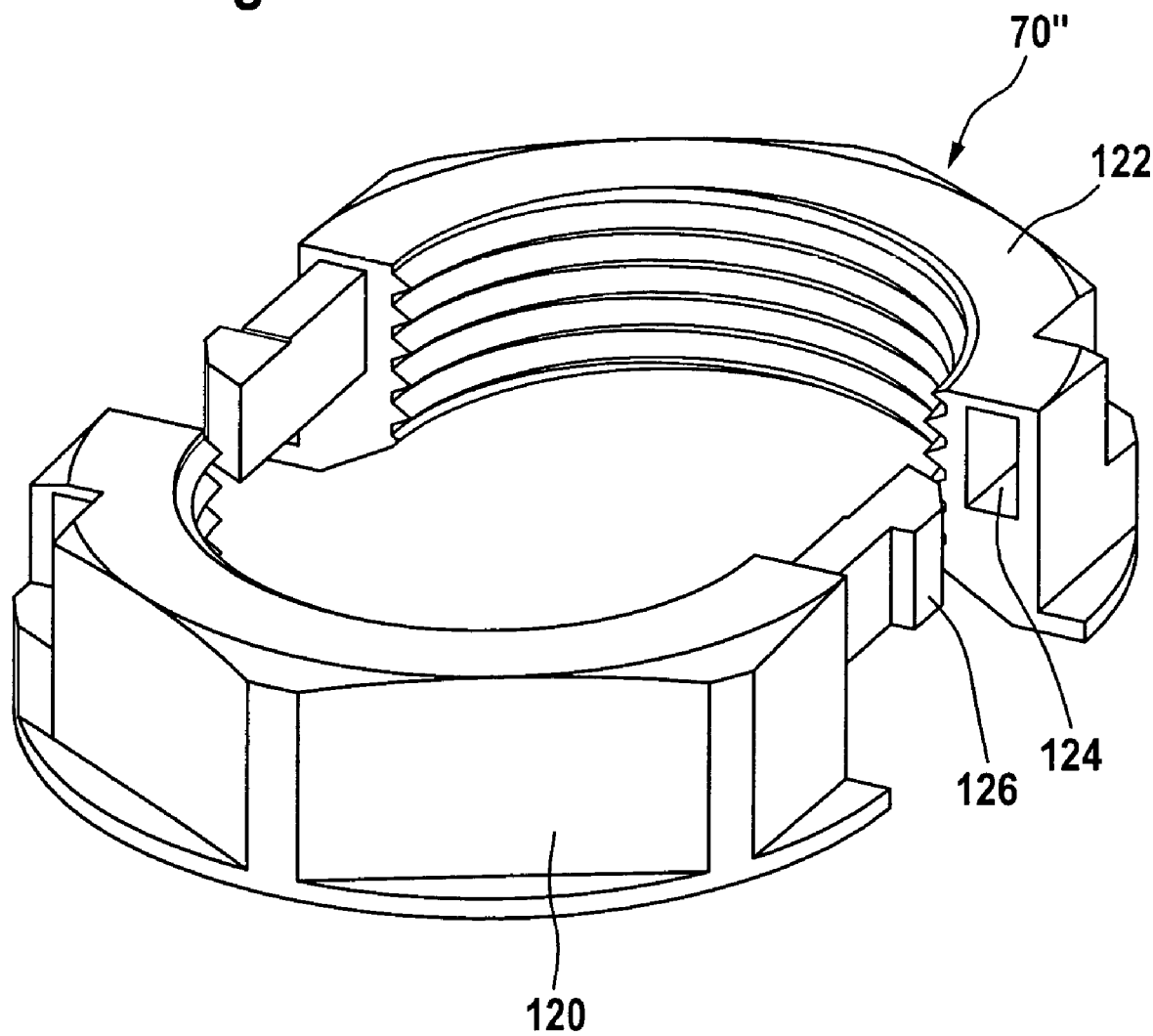
FIG. 9 shows an illustration of the pressure ring according to FIG. 8 in its divided position.

In a sixth embodiment of a cable feed-through according to the invention, as illustrated in FIGS. 8 and 9, the pressure ring 70" is designed as a pressure ring 70" which can be divided along a dividing plane 118 and is constructed of two pressure ring parts 120 and 122 which can be locked to one another to form a complete pressure ring 70" via locking hooks 126 which can be brought into engagement with locking recesses 124.

As a result, it is not necessary for the pressure ring 70" to have to be moved over and beyond the tongues 52, as is required, in particular, in the first, second, third and fourth embodiments.

On the contrary, the pressure ring 70" can be placed directly on the external thread 74 of the housing socket 10 due to the fact that the pressure ring parts 120 and 122 are placed on the external thread 74 with the correct alignment relative to one another and are connected to one another by bringing the locking recesses 124 into engagement with the locking hooks 126 and so the complete pressure ring 70" is not formed until it is on the external thread 74 and can then be rotated in the same way as the pressure ring 70 or the pressure ring 70' already described and can be displaced in the direction of the central axis 32 as a result of rotation.

With respect to the remaining features, reference is therefore made to the explanations concerning the first to fourth embodiments.

Figure 10:
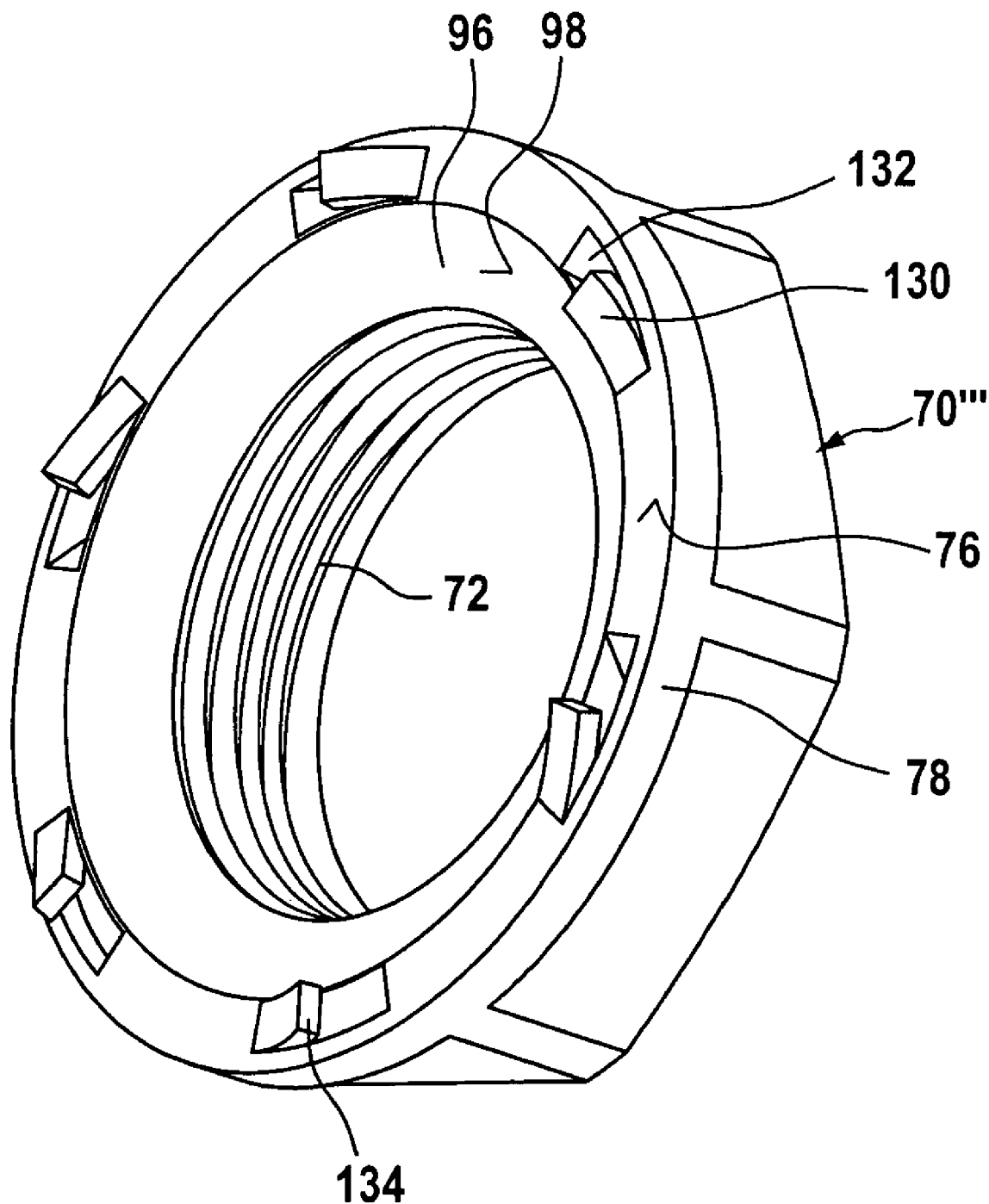

In a seventh embodiment, illustrated in FIG. 10, the pressure ring 70''' is designed in accordance with the first embodiment. However, the pressure ring 70''' is provided in the area of the pressure flange 78 with elastic pretensioning elements 130 which protrude above the flange surface 76, rise up out of recesses 132 associated with the pretensioning elements 130 and act first of all on the wall area 40 when the pressure ring 70''' is rotated in order to abut the flange surface 76 on the wall area 40 and are then moved into the recesses 132 when the elastic force is overcome during further rotation of the pressure ring 70'''.

The pretensioning elements 130 therefore lead to a frictional securing of the pressure ring 70''' even if the pressure ring 70''' is not tightened securely and, therefore, to an improvement in the permanency of the assembly of the housing socket 10 on the wall area 40.

In addition, the pretensioning elements 130 can act as barbs against any loosening of the pressure ring 70''' on account of their end surfaces 134 and, as a result, contribute to a certain extent to the improvement in the securing of the pressure ring 70''' on the wall area 40 in a form-locking manner.

Figure 11:
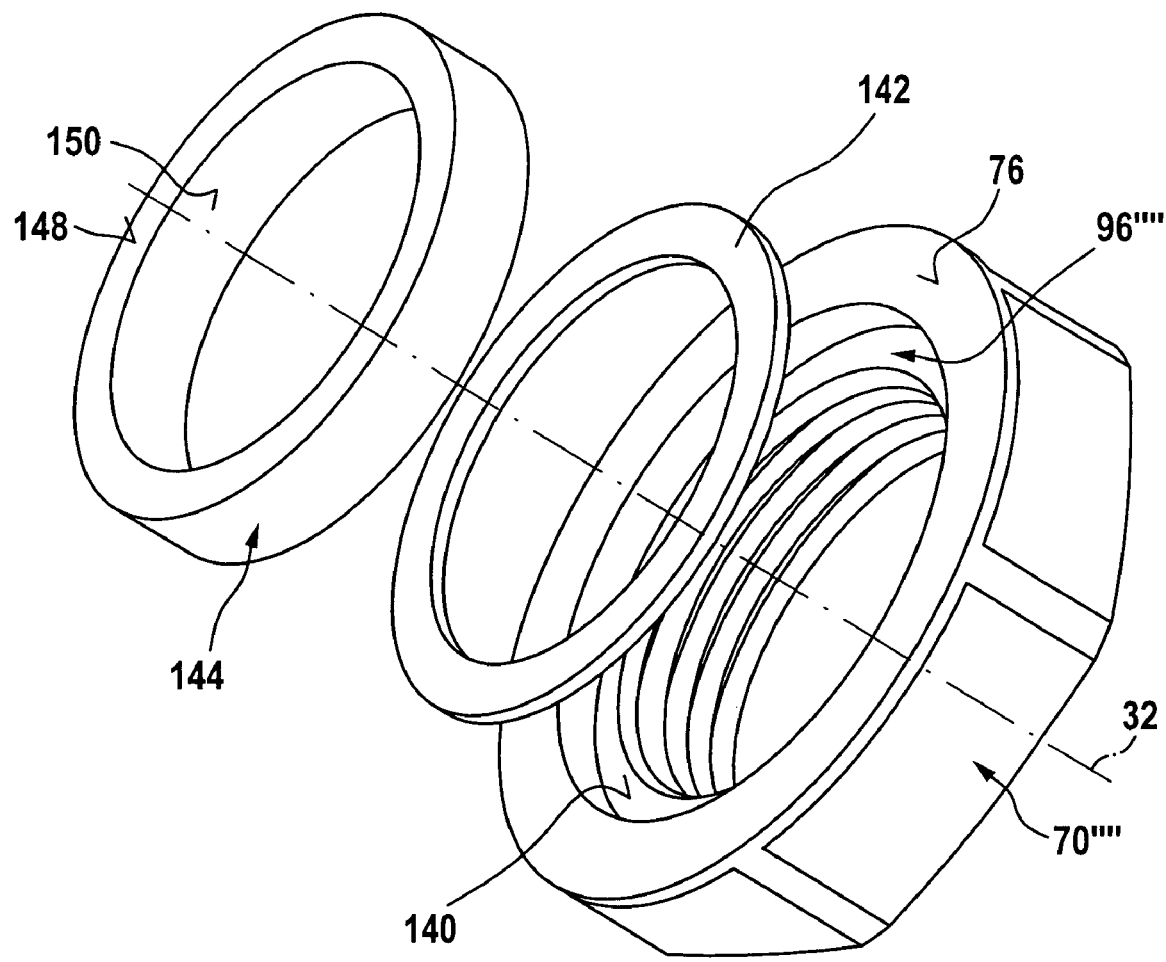
Figure 12:
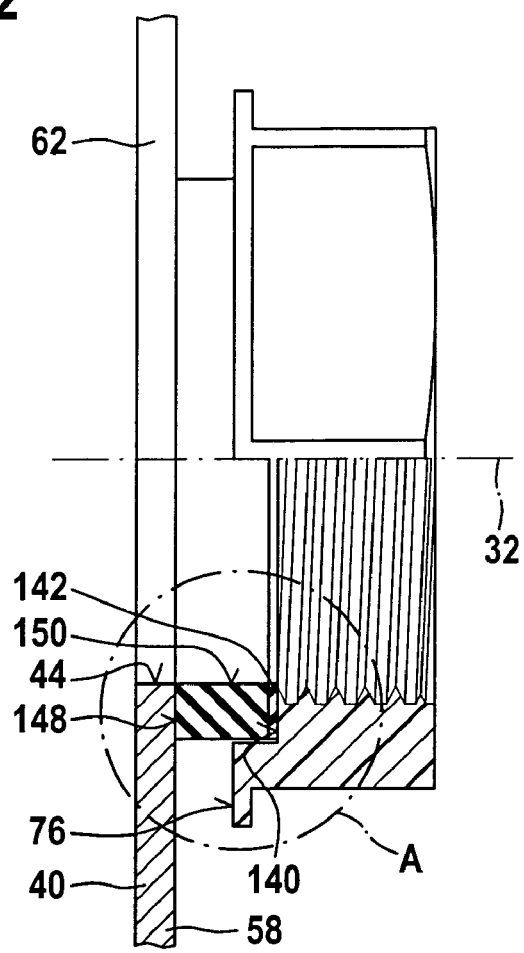
FIG. 12 shows a partial section through the pressure ring of the eighth embodiment according to FIG. 11 in the assembled state.
Figure 13:
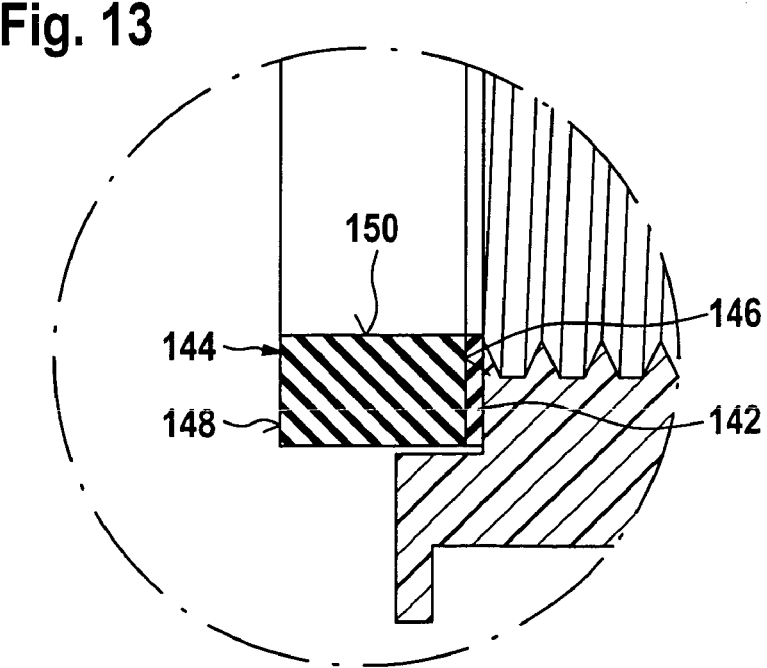
FIG. 13 shows an enlarged illustration of an area A in FIG. 12.

In an eighth embodiment of a cable feed-through according to the invention, illustrated in FIGS. 11 to 13, the pressure ring 70'''' is provided with a recess 96" which has a flange ring surface 140 extending parallel to the flange surface 76. An intermediate ring 142, preferably formed from a foil sliding in relation to the flange ring surface 140, lies on this flange ring surface 140 and a ring 144 consisting of an elastic material is arranged on a side of the intermediate ring 142 located opposite the flange ring surface 140, rests on the intermediate ring 142 with an end surface 146 and faces the first side 58 of the wall area 42 with an end face 148 located opposite and can abut on it.

In addition, the elastic ring 144 is provided with an inner shell surface 150 which can abut on the circumferential surface 101 of the housing socket 10 in order to connect sealingly to it.

The elastic ring 144 is formed from a soft elastic material, for example, a rubber material or a porous elastic material which may be pressed together, on the one hand, in the direction of the central axis 32 in order to generate a pretensioning force which extends approximately parallel to the central axis 32 and with which a force may be generated parallel to the central axis 32 during the insertion of the housing socket 10 with the assembly section 42 into the opening 44 and abutment of the elastic ring 144 with the end surface 148 on the side 58 of the wall section 40, this force abutting the supporting surfaces 60 on the edge 62 of the opening 44 and, therefore, leading to a securing of the supporting surfaces 60 on the edge 62 of the opening acted upon with a force so that, as a result, the assembly section 42 can also be secured on the wall area 40, at least to a certain extent, in a force-locking manner and so as to be non-rotatable.

As a result of further rotation to secure the pressure ring 70'''', the force is increased parallel to the central axis 32 for such a time until the elastic ring 144 is deformed to such an extent that the flange surface 76 abuts on the side 58 of the wall area 40 and acts directly on it.

The deformation of the elastic ring 144 in a direction parallel to the central axis 32 leads to a broadening of its cross sectional shape in a radial direction in relation to the central axis 32 and, therefore, to a secure abutment of the inner shell surface 150 on the circumferential surface 101 so that the flexible element 144 serves, first of all, as a pretensioning element, on the one hand, during the insertion of the assembly section 42 into the opening 44 and, subsequently, during continued tightening of the pressure 70'''' as a sealing element which connects sealingly to the side 58, on the one hand, and, on the other hand, to the circumferential surface 101 of the housing socket 10.

Figure 14:
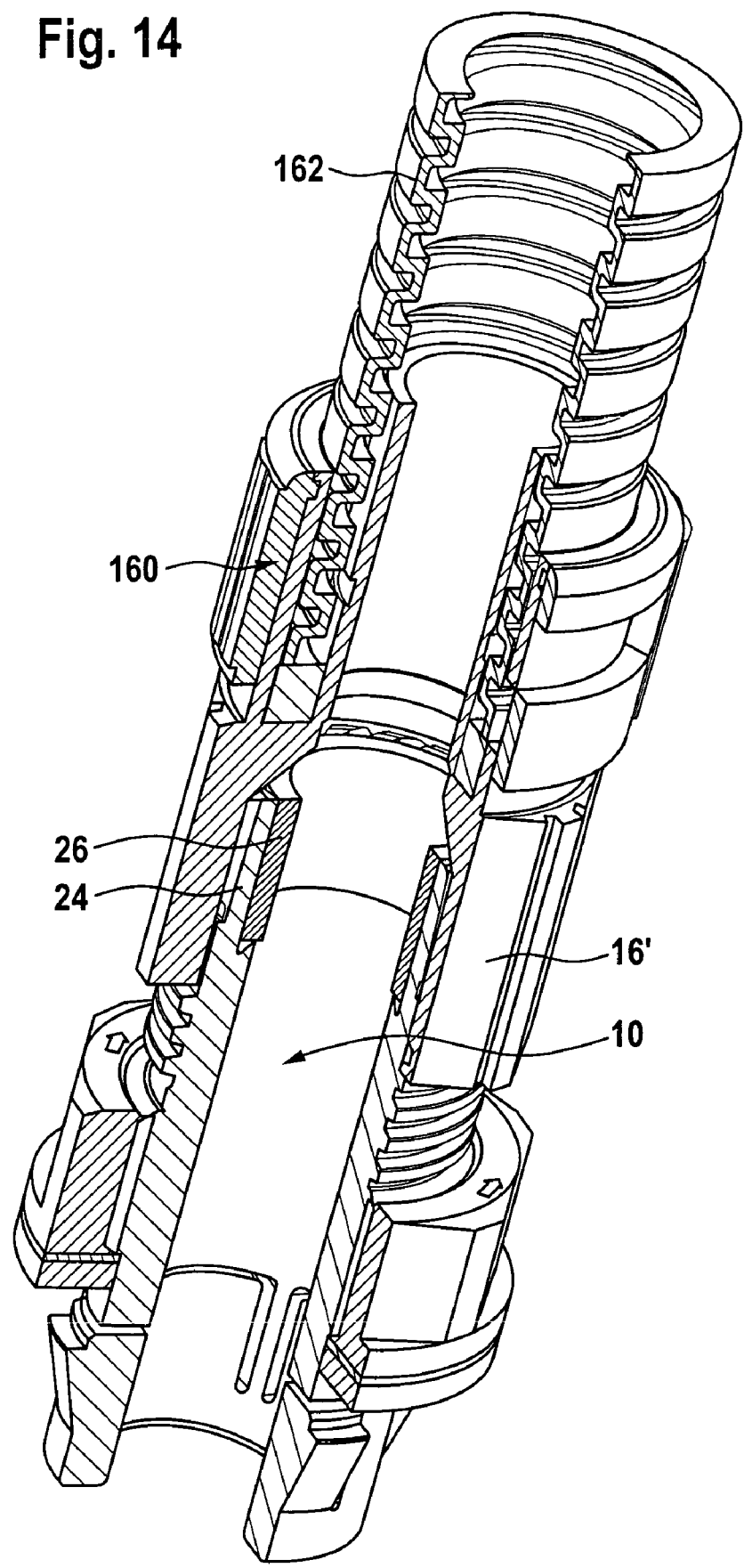
FIG. 14 shows an perspective illustration similar to FIG. 1 through a ninth embodiment of an insert according to the invention as cable feed-through and FIG. 15 shows a perspective illustration of a tenth embodiment of an insert according to the invention as a blind insert.

In a ninth embodiment of a cable feed-through according to the invention, illustrated in FIG. 14, those elements which are identical to those of the preceding embodiments are given the same reference numerals and so reference can be made in full to the explanations concerning the preceding embodiments with respect to their description.

In contrast to the preceding embodiments, the cap nut 16' of the ninth embodiment is not simply designed as a mere cap nut but rather comprises a receiving means 160 for a protective tube 162 which is designed as an undulatory tube and within which the cable to be guided through the cable feed-through 10 extends.

However, the cap nut 16' serves the purpose, in the same way as in the preceding embodiments, of acting upon the fin basket 24 which accommodates the sealing ring 26 so that the sealing ring 26 is pressed against the cable 14 to be guided through and, therefore, a sealed connection between the housing socket 10 and the cable 14 to be guided through is brought about in the same way as in the preceding embodiments.

Figure 15:
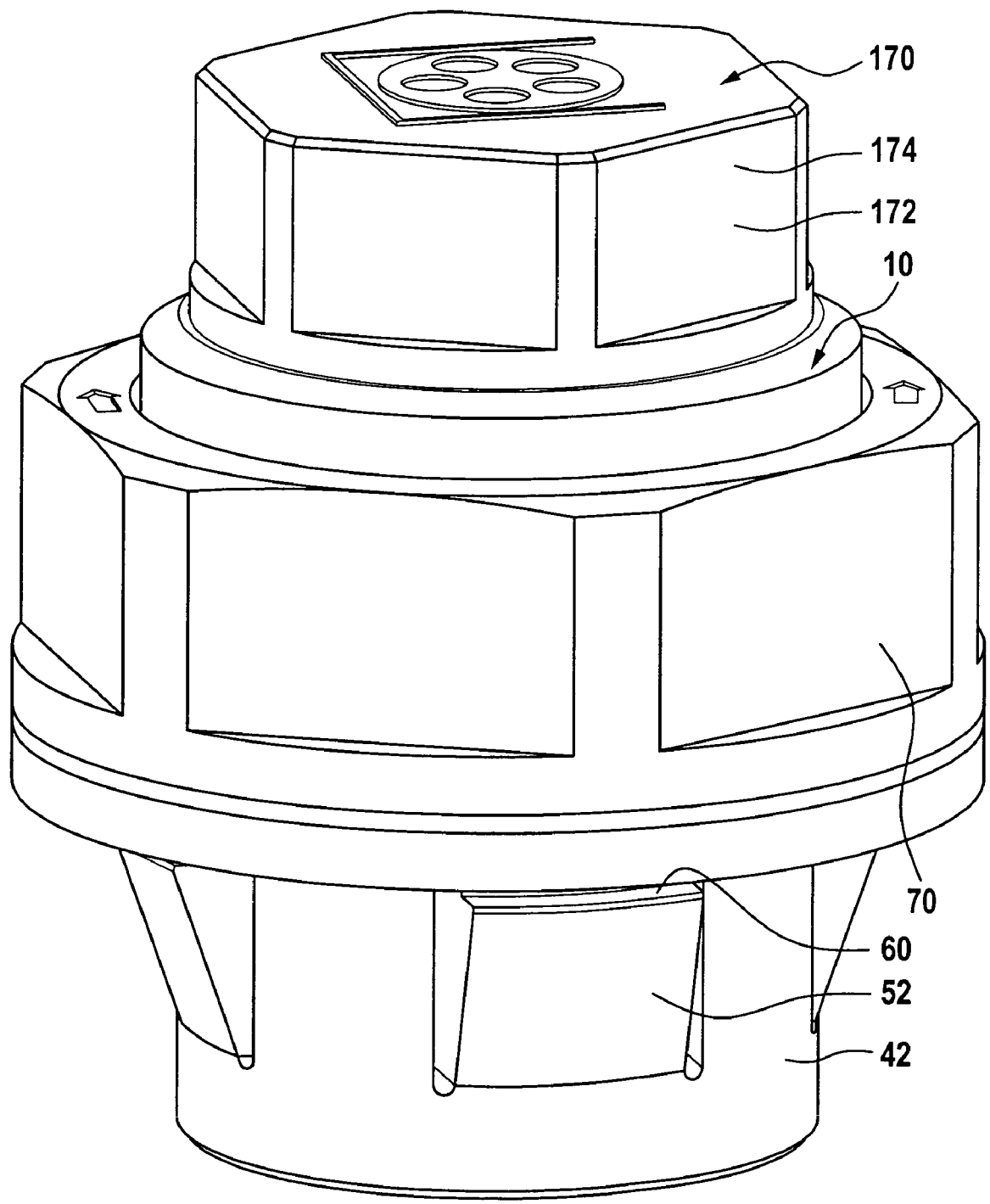

In the tenth embodiment of an insert according to the invention, illustrated in FIG. 15 and designed, in this case, as a blind insert for the opening 44 in the wall area 40, the housing socket has on its side facing away from the assembly device 41 a closure member 170 which, in the simplest case, is integrally formed in one piece on the housing socket 10 and closes this hermetically.

The closure member 170 is preferably provided with a tool engaging element 172, in the case illustrated in the drawing a multiple cornered member with flat sides 174, which allows the tool engaging element 172 to be engaged with a tool and, therefore, the housing socket 10 to be held non-rotatably while a rotation of the pressure ring 70 takes place at the same time in order to rotate this in the first direction of rotation 85 and, therefore, secure the housing socket in the opening 44 of the wall area 40.

With respect to the remaining elements, the insert according to the tenth embodiment is designed in the same way as the preceding embodiments and so the same reference numerals are used for the same elements and, as for the rest, reference is made in full to the explanations concerning the preceding embodiments.

The invention claimed is:

1. Insert for an opening in a wall area of an appliance, comprising:
    a housing socket,
    a fixing member provided on the housing socket, said fixing member comprising a fin basket in an end area of the housing socket and a clamping element acting on the fin basket, said clamping element being provided on the housing socket and rotatable about a central axis of a central passage for securing a cable to be guided through the fixing member,
    an assembly device provided on the housing socket, with an assembly section adapted to be guided through the opening in the wall area and having elements engaging behind an edge of the opening and a pressure ring arranged on the housing socket at a distance from the elements, said pressure ring being adjustable in a direction of the elements by means of an advancing guide as a result of a rotary movement of said pressure ring about the central axis,
    the pressure ring being rotatable for securing the housing socket in a first direction of rotation extending in an opposite direction to a second direction of rotation of the clamping element for securing the cable guided through the fixing member.

2. Insert as defined in claim 1, wherein the advancing guide comprises a first threaded guide.

3. Insert as defined in claim 2, wherein the first threaded guide for moving the pressure ring comprises a thread which is self-locking on account of its pitch.

4. Insert as defined in claim 2, wherein the pressure ring is adjustable in the direction of the elements by the first threaded guide having a greater self-locking than a second threaded guide provided for the movement of the clamping element for securing the cable.

5. Insert as defined in claim 2, wherein the first threaded guide provided for the pressure ring has at least one thread turn with a smaller pitch than at least one thread turn of a second threaded guide.

6. Insert as defined in claim 2, wherein:
    a second threaded guide is provided for moving the clamping element, and
    the second threaded guide comprises a multiple thread.

7. Insert as defined in claim 2, wherein:
    a second threaded guide is provided for moving the clamping element, and
    the second threaded guide comprises a trapezoidal thread.

8. Insert as defined in claim 1, wherein the clamping element is designed as a holding section element.

9. Insert as defined in claim 1, wherein the housing socket has a tool engaging element on a side facing away from the assembly device.

10. Insert as defined in claim 1, wherein the elements have supporting surfaces movable radially in relation to a central axis of the central passage and engaging behind an edge of the opening in the wall area.

11. Insert as defined in claim 10, wherein centering surfaces are provided on the elements, which centering surfaces are associated with the supporting surfaces.

12. Insert as defined in claim 11, wherein the assembly section has elements arranged on oppositely located sides.

13. Insert as defined in claim 1, wherein the elements are provided with a coating increasing friction.

14. Insert as defined in claim 1, wherein the elements are provided with surface structures inhibiting a rotation of the assembly section.

15. Insert as defined in claim 1, wherein the pressure ring has a flange surface facing the wall area.

16. Insert as defined in claim 1, wherein the pressure ring has a receiving means for a sealing ring.

17. Insert as defined in claim 16, wherein:
    the pressure ring has a flange surface facing the wall area, and
    the receiving means is designed as a recess adjoining the flange surface, which recess merges into a threaded passage in the pressure ring.

18. Insert as defined in claim 17, wherein the recess has a pressing surface acting on the sealing ring in a direction of the wall area and in a direction of the assembly section.

19. Insert as defined in claim 16, wherein the assembly section has a cylindrical contact surface for the sealing ring.

20. Insert as defined in claim 1, wherein the pressure ring is provided with at least one elastic pretensioning element.

21. Insert as defined in claim 20, wherein the pressure ring has multiple pretensioning elements held on it in a flexible manner.

22. Insert as defined in claim 21, wherein the pretensioning elements are designed so as to project from a flange surface of the pressure ring in a direction of the wall area.

23. Insert as defined in claim 1, wherein the pressure ring is movable beyond the elements towards a threaded guide provided for the movement thereof.

24. Insert as defined in claim 23 wherein the pressure ring is movable beyond the elements of the assembly section due to an elastic deflection movement of said elements.

25. Insert as defined in claim 23, wherein the pressure ring has recesses corresponding to the size and arrangement of the elements.

26. Insert as defined in claim 25, wherein the recesses of the pressure ring are provided on threads of the pressure ring.

27. Insert as defined in claim 1, wherein the pressure ring is adapted to be divided into pressure ring parts along a dividing surface and placed on the assembly section with connection of the two pressure ring parts.

28. Insert for an opening in a wall area of an appliance, comprising:
    a housing socket,
    an assembly device provided on the housing socket, with an assembly section adapted to be guided through the opening in the wall area and having elements engaging behind an edge of the opening and a pressure ring arranged on the housing socket at a distance from the elements. said pressure ring being adjustable in a direction of the elements by means of an advancing guide as a result of a rotary movement of said pressure ring about the central axis, the pressure ring being rotatable in a first direction of rotation for securing the housing socket, the housing socket being adapted to be fixed against any co-rotation in the first direction of rotation by means of a holding section element, and the assembly section having projections frictionally interacting with an edge of the opening in areas outside the elements.

29. Insert as defined in claim 28 wherein the projections are designed as ribs.

\* \* \* \* \*